United States Patent
Laville et al.

(10) Patent No.: US 9,821,471 B2
(45) Date of Patent: Nov. 21, 2017

(54) ACTUATION OF A HAND TO BE PROVIDED ON A HUMANOID ROBOT

(71) Applicant: SOFTBANK ROBOTICS EUROPE, Paris (FR)

(72) Inventors: Jérémy Laville, Paris (FR); Gilles Fauchet, Paris (FR); Thibault Depost, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 0 days.

(21) Appl. No.: 15/304,038

(22) PCT Filed: May 7, 2015

(86) PCT No.: PCT/EP2015/060022
§ 371 (c)(1),
(2) Date: Oct. 13, 2016

(87) PCT Pub. No.: WO2015/169886
PCT Pub. Date: Nov. 12, 2015

(65) Prior Publication Data
US 2017/0043486 A1 Feb. 16, 2017

(30) Foreign Application Priority Data
May 7, 2014 (FR) .................................... 14 54162

(51) Int. Cl.
*B25J 15/10* (2006.01)
*B25J 15/00* (2006.01)
(Continued)

(52) U.S. Cl.
CPC ....... *B25J 15/0009* (2013.01); *B25J 15/0233* (2013.01); *B25J 15/086* (2013.01); *B25J 15/103* (2013.01)

(58) Field of Classification Search
CPC .. B25J 15/0009; B25J 15/0233; B25J 15/086; B25J 15/10; B25J 15/103; A61F 2/586; Y10S 901/38
(Continued)

(56) References Cited

U.S. PATENT DOCUMENTS 4,865,376 A * 9/1989 Leaver ................... B25J 9/1045
294/111
5,092,646 A * 3/1992 Smallridge .............. B25J 9/104
254/278

(Continued)

FOREIGN PATENT DOCUMENTS

CN 201 734 803 U 2/2011
JP S54-11791 US 1/1979
(Continued)

*Primary Examiner* — Dean Kramer
(74) *Attorney, Agent, or Firm* — Baker & Hostetler LLP

(57) ABSTRACT

A hand intended for a humanoid robot comprising a palm and several fingers, each of the fingers being able to be displaced in relation to the palm between a position of rest maintained by spring effect and a compressed position obtained by driving a link part with the palm countering the spring effect, comprises a motorized shaft, linked to the link part of each of the fingers, and configured to respectively displace at least one first finger and at least one second finger, from the position of rest to the compressed position, by rotation of the motorized shaft respectively in a first direction of rotation and in an opposite direction.

10 Claims, 5 Drawing Sheets

(51) Int. Cl.
 *B25J 15/02* (2006.01)
 *B25J 15/08* (2006.01)
(58) Field of Classification Search
 USPC .......................................................... 294/111
 See application file for complete search history.

(56) References Cited

U.S. PATENT DOCUMENTS

| 2009/0025502 A1 | 1/2009 | Nakamoto |
| 2010/0011899 A1 | 1/2010 | Kim et al. |
| 2013/0285404 A1 | 10/2013 | Lin et al. |

FOREIGN PATENT DOCUMENTS

| JP | 2005-059110 A | 3/2005 |
| JP | 2008-018489 A | 1/2008 |
| JP | 2010-247294 A | 11/2010 |
| WO | 2015/110521 A1 | 7/2015 |

\* cited by examiner

ACTUATION OF A HAND TO BE PROVIDED ON A HUMANOID ROBOT

CROSS-REFERENCE TO RELATED APPLICATIONS

This application is a National Stage of International patent application PCT/EP2015/060022, filed on May 7, 2015, which claims priority to foreign French patent application No. FR 1454162, filed on May 7, 2014, the disclosures of which are incorporated by reference in their entirety.

FIELD OF THE INVENTION

The invention relates to a hand intended for a humanoid robot. More specifically, it relates to a hand in which the fingers can be displaced from a position of rest to two distinct positions by means of a single actuator.

BACKGROUND

The human hand is an extremely complex part of the human body. It comprises several fingers articulated around the palm of the hand. Moreover, each finger has several mutually articulated phalanges. Each articulation is mobile by means of muscles. The different articulations of the hand allow objects of different forms to be grasped. The relative position of the fingers and of the palm also makes it possible to produce signs or symbols making it possible to communicate a message, for example the index finger extended to point to an object or a direction, the thumb extended to signify approval, etc. The control of the movements of the fingers of the hand is therefore of particular interest for reinforcing the humanoid nature of a robot and its interaction capabilities. One difficulty lies in the large number of actuators necessary to ensure the independent control of the movements of the fingers.

It is unrealistic to independently drive the movement of each of the phalanges of each of the fingers of the hand, as much for the gripping of an object as for the communication of a visual message. The aim in practice is to give the greatest possible number of movements with the smallest number of actuators. As is known, a mechanism is said to be underactuated when the number of drivable actuators A is less than the number of degrees of freedom N, i.e. when N>A. The degree of underactuation is then defined as the difference (N−A). An underactuated hand is for example known in which four fingers with three phalanges and one finger with two phalanges can be closed by a single actuator. By making it possible to drive fourteen degrees of freedom via fourteen pivot links by means of a single actuator, such a hand exhibits a high degree of underactuation.

Efforts have been made to improve the capacity to control a hand while retaining a high degree of underactuation of the hand. The implementation of a spreader, arranged between the actuator and the fingers so as to distribute the gripping force over each of the fingers, is for example known. The hand can thus, by means of a single actuator, grasp objects of different forms. The hand can however be driven only between an open position and a closed position, the respective position of each of the fingers in the closed position depending on the form of the object grasped. If no object is interposed between the fingers, the latter close up to a position representing a closed point.

To reinforce the humanoid nature of a robot and its interaction capabilities, it remains desirable to increase the possibilities for controlling the movements of a hand while retaining a high degree of underactuation. Obviously, the solution must be able to fit into the structural and functional environment of the robot.

SUMMARY OF THE INVENTION

To this end, the subject of the invention is a hand intended for a humanoid robot, the hand comprising a palm and several fingers, each of the fingers being able to be displaced in relation to the palm between a position of rest maintained by spring effect and a compressed position obtained by driving a link part between said finger and the palm, countering the spring effect. The hand further comprises a motorized shaft, linked to the link part of each of the fingers, and configured so as to respectively displace at least one first finger and at least one second finger, from the position of rest to the compressed position, by rotation of the motorized shaft respectively in a first direction of rotation and in an opposite direction.

Advantageously, the shaft comprises a first and a second radial profile, respectively on a first and a second portion of its circumference, configured to drive the link part of a finger upon a rotation of the shaft respectively in the first direction and the opposite direction of rotation.

Advantageously, one of the fingers of the hand is displaced by rotation of the shaft only in one of the two directions of rotation.

Advantageously, the fingers in the position of rest represent, with the palm, an open hand.

Advantageously, two of the fingers are located in the palm so as to respectively be like a thumb and an index finger, the thumb or the index finger being maintained in the position of rest upon a rotation of the shaft in a first direction, and in which the rotation of the shaft in an opposite direction displaces all the fingers of the hand to a compressed position so as to represent, with the palm, a closed hand.

Advantageously, the link part of one of the fingers comprises a cable linked on one side to the finger and on the other side to the shaft by means of a crimping housed in a cavity of the shaft; the cable passing radially through the shaft through a duct linking the cavity and an end of one of the radial profiles, such that the rotation of the shaft in one direction of rotation winds the cable on said radial profile, driving the displacement of the finger by pulling the cable.

Advantageously, the radial profile of one of the fingers is substantially circular over a portion of circumference close to a semi-circle centered on the axis of rotation of the shaft, and on which the cable of said finger can be wound; the diameter of the radial profile determining the travel of the cable and the amplitude of the displacement of the finger between the position of rest and the compressed position.

Advantageously, the link part of one of the fingers comprises a crimping mounted to rotate freely in the cavity centered on the axis of rotation of the shaft; the duct being configured to allow the cable to pass through the shaft radially all along a radial profile, such that the finger is maintained in the position of rest upon a rotation of the shaft.

Advantageously, the shaft has several first and second radial profiles arranged in succession according to the axis of rotation of the shaft, for the simultaneous displacement of several fingers.

Advantageously, the hand comprises two identical fingers linked to the shaft by two cables of identical lengths and two identical crimpings. The shaft comprises two housing cavities formed in the shaft at two distinct distances from the axis of rotation of the shaft, making it possible to locate the two fingers in the palm of the hand at two distinct distances from the axis of rotation of the shaft.

Advantageously, the link part of one of the fingers is rigid and in which the shaft comprises a first and a second cam; the rigid link part being displaced respectively by means of the first and second cams by rotation of the shaft respectively in the first direction and in the opposite direction.

The invention relates also to a humanoid robot equipped with a hand having the features described previously.

BRIEF DESCRIPTION OF THE DRAWINGS

The invention will be better understood and other advantages will become apparent on reading the detailed description of an embodiment given by way of example in the following figures.

In the interests of clarity, the same elements will bear the same references in the different figures.

DETAILED DESCRIPTION

Figure 1A:
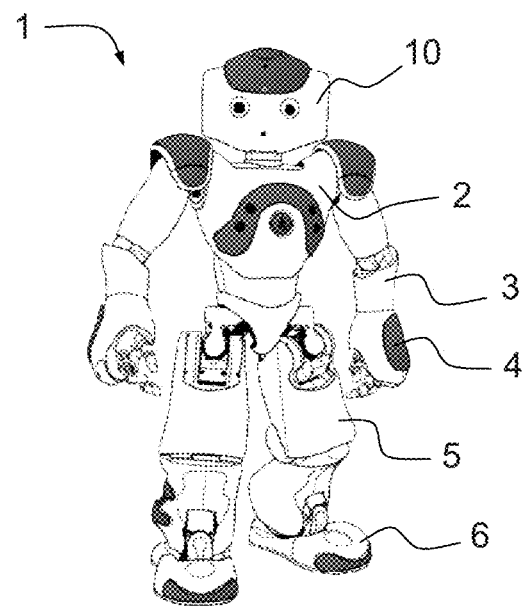
FIGS. 1a and 1b represent two examples of humanoid robots that can be equipped with two hands according to the invention.
Figure 1B:
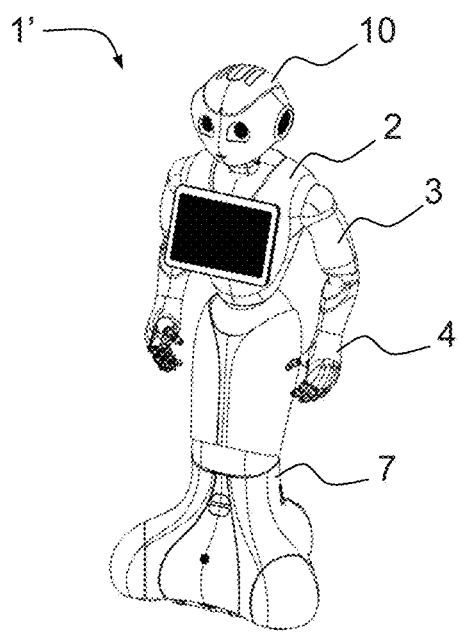

FIGS. 1a and 1b represent two examples of humanoid robots developed by the company ALDEBARAN ROBOTICS™. The humanoid robot 1 represented in FIG. 1a comprises a head 10, a trunk 2, two arms 3, two hands 4, two legs 5 and two feet 6. The humanoid robot 1' represented in FIG. 1b comprises a head 10, a trunk 2, two arms 3, two hands 4 and a skirt 7. The invention relates to a hand with which these types of humanoid robots can be equipped.

The invention is described hereinbelow in the particular case of a hand comprising four fingers located in a palm. Three fingers consisting of three phalanges are like an index finger, a middle finger and a ring finger. A fourth consisting of two phalanges is like a thumb. Obviously the invention is not limited to this particular example, but more widely covers a hand comprising a palm and several motorized fingers making it possible, in the manner of a human being, to displace the fingers in relation to the palm. Furthermore, the invention is implemented in a hand to reinforce the humanoid nature of the robot, for example by allowing improved visual communication. It is understood that the invention can be implemented according to the same principle and with the same benefits for other members, for example a humanoid robot foot or a paw of a robot of animal nature. Hereinbelow, the term hand generally denotes a member comprising a palm and fingers that are motorized relative to the palm.

Figure 2A:
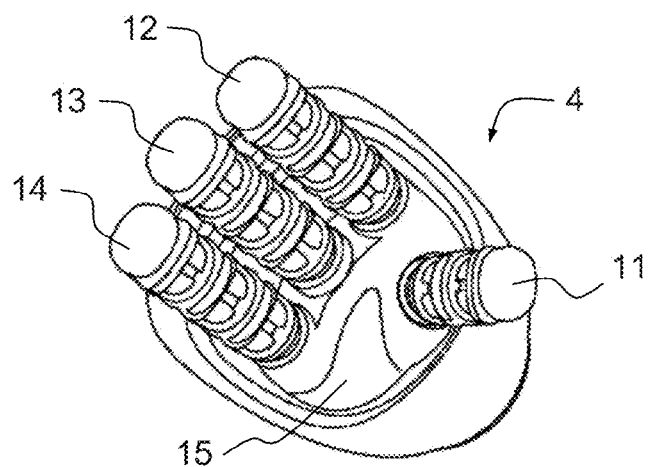
FIGS. 2a, 2b and 2c represent an example of a humanoid robot hand comprising a palm and fingers positioned so as to represent the hand in "open hand," "closed hand" and "index finger extended" configuration.
Figure 2B:
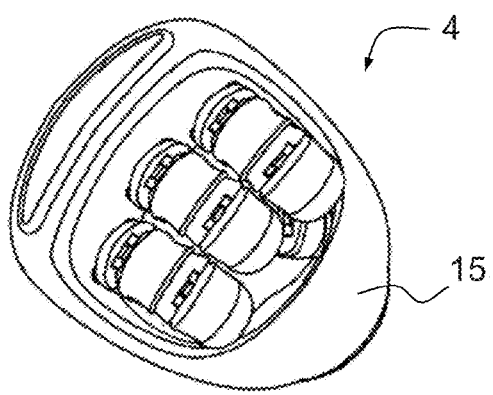
Figure 2C:
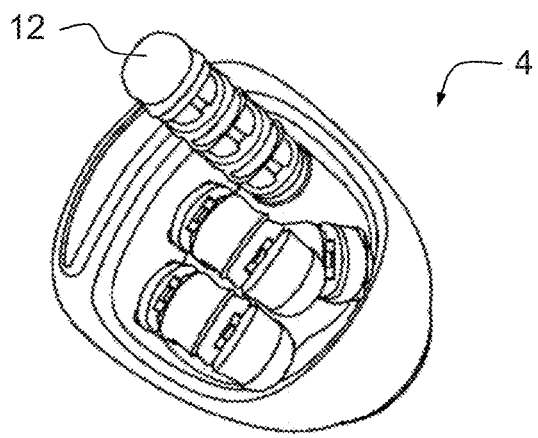

FIGS. 2a, 2b and 2c represent an example of a humanoid robot hand according to the invention comprising a palm and fingers positioned so as to represent the hand in "open hand", "closed hand" and "index finger extended" configurations. In the example represented in the figures, the hand comprises a palm 15, three fingers 12, 13 and 14 consisting of three phalanges and one finger 11 consisting of two phalanges. By their form and their location in the palm of the hand, the fingers 11, 12, 13 and 14 respectively constitute the thumb, the index finger, the middle finger and the ring finger of the hand 4. FIG. 2a represents the hand in "open hand" configuration, FIG. 2b in "closed hand" configuration and FIG. 2c in "index finger extended" configuration.

Figure 3A:
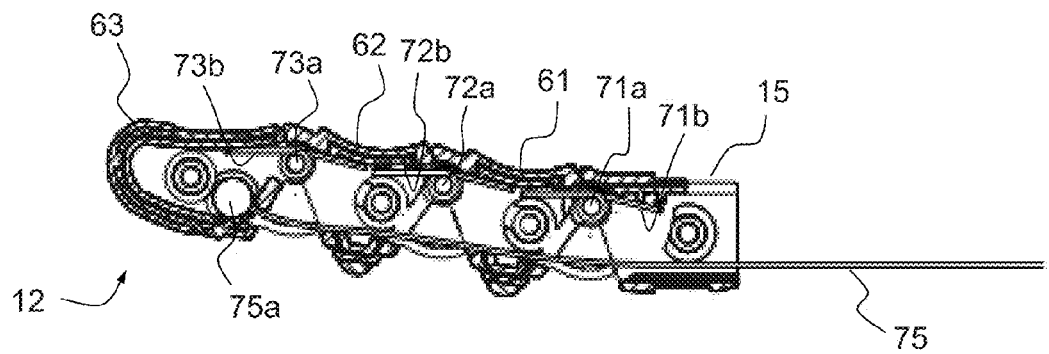
FIGS. 3a and 3b represent an example of a humanoid robot finger consisting of several phalanges, respectively in "finger extended" and "finger folded down" position.
Figure 3B:
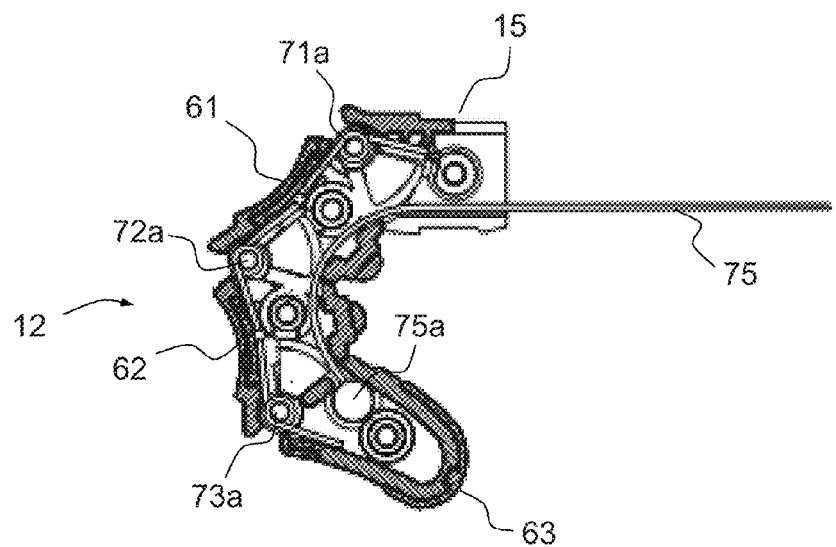

FIGS. 3a and 3b represent an example of a humanoid robot finger consisting of several phalanges respectively in "finger extended" and "finger folded down" positions. Various types of underactuated hand are known that seek to drive, by means of a limited number of actuators, the greatest number of degrees of freedom of the fingers of the hand. In one widely-used design illustrated in the figures, each finger comprises several phalanges linked in succession to one another. For example, the finger 12 comprises in succession a proximal phalange 61, linked to the palm 15, a middle phalange 62, and a distal phalange 63, furthest away from the palm. The phalanges are linked together and with the palm by a link with one or more degrees of freedom, for example a pivot link. For example, the palm 15 and the phalange 61 are linked by a pivot link 71a; the phalanges 61 and 62 are linked by a pivot link 72a; and the phalanges 62 and 63 are linked by a pivot link 73a. In a default position, hereinafter called position of rest, the phalanges of the fingers are maintained in position by spring effect. This maintaining can be obtained at each pivot link by means of a mechanical abutment limiting the angular travel of the pivot link and a spring mechanism positioning the phalanges in mechanical abutment. Thus, the phalanges 61, 62 and 63 are maintained in a position of rest representing an extended finger, by means of the helical springs 71b, 72b and 73b wound around the pivot links 71a, 72a and 73a.

Each finger further comprises a link part between the finger and the palm configured to drive the displacement of the finger in relation to the palm, from the position of rest to another position by exerting a force countering the spring effect. For example, the link part can comprise a cable 75 passing through the phalanges of the finger and linked on one side to the distal phalange 63, for example by means of a crimping 75a, and on the other side to an electrical actuator (not represented) in the palm. By exerting a pulling force greater than the return force of the springs, the actuator drives the rotation of each of the phalanges, and displaces the finger from its position of rest to an extreme position, called compressed position, represented in FIG. 3b.

In an underactuated hand minimizing the number of actuators, the cables of each of the fingers are linked to a single actuator, capable of simultaneously displacing all the fingers from the position of rest to the compressed position. To allow objects of varied forms to be grasped, as previously mentioned, interposing a spreader between the actuator and the cables of each of the fingers has also been envisaged, so as to distribute the pulling force transmitted to the different cables.

There now follows a description below of an underactuated hand according to the invention, in this particular case of a hand comprising several fingers, each finger comprising several phalanges maintained in one position by a spring mechanism and a link cable, the pulling of which by an actuator makes it possible to rotationally drive each phalanx by countering the spring effect. This implementation is not limiting on the present invention. Other implementations can also be envisaged. The fingers can for example comprise a single phalanx that can be displaced between two extreme positions. When a finger comprises several phalanges, the spring effect maintaining the finger in the position of rest can be obtained by means of a set of helical springs associated with each of the pivot links of the different phalanges, as illustrated by FIGS. 3a and 3b, or by means of a spring mechanism formed by a single part linking each of the phalanges and exerting a return force maintaining all of the phalanges in the position of rest. Similarly, the link part between the finger and the palm can comprise a flexible cable 75, such as a metal cable, linking the motorized actuator ensuring the pulling of the cable to the distal phalanx. Also envisaged is a link part consisting of a rigid mechanical part in contact by one end with a motorized actuator comprising a shaft provided with cams, the rotation of which drives the rigid part in movement to displace the finger.

Hereinbelow, the position of rest of each of the fingers corresponds to an extended finger for a human hand. All the fingers are in a position of rest in the "open hand" configuration represented in FIG. 2a. The compressed position of each of the fingers corresponds to a finger folded down against the palm. All the fingers are in a compressed position in the "closed hand" configuration represented in FIG. 2b. This position of each of the fingers in relation to the palm for the position of rest and the compressed position is chosen by convention; this choice offering certain advantages in terms of consumption of the motor, life span, or resistance to a fall. It is however possible, without departing from the scope of the invention, to choose, for the position of rest of one or all of the fingers, the position in which the finger or fingers is/are folded down against the palm. The motorized actuator then makes it possible to open the finger or fingers of the hand.

The general idea of the present invention is to add a movement possibility to a hand while retaining the same degree of underactuation. The invention consists in driving one or more fingers from their position of rest, by rotation of a motorized shaft in a first direction, and one or more fingers by rotation in the opposite direction of rotation. The invention advantageously exploits the two motor capabilities of a rotary actuator to allow two distinct movements of the fingers of the hand from a same initial configuration. In the embodiment represented in the figures, a rotation of the rotary actuator in a first direction makes it possible to switch over from the "open hand" configuration to the "closed hand" configuration, a rotation in the opposite direction makes it possible to switch over from the "open hand" configuration to the "index finger extended" configuration. As previously, the position of each of the fingers for the three configurations is arbitrary. The hand can be adapted so that each of the fingers can be displaced upon a rotation in a first direction of rotation, in the opposite direction of rotation, in both directions of rotation or neither of the two directions of rotation. Generally, the invention relates to a motorized shaft configured to respectively displace at least one first finger and at least one second finger from their position of rest to their compressed position by rotation of the motorized shaft respectively in a first direction of rotation and in an opposite direction.

Figure 4A:
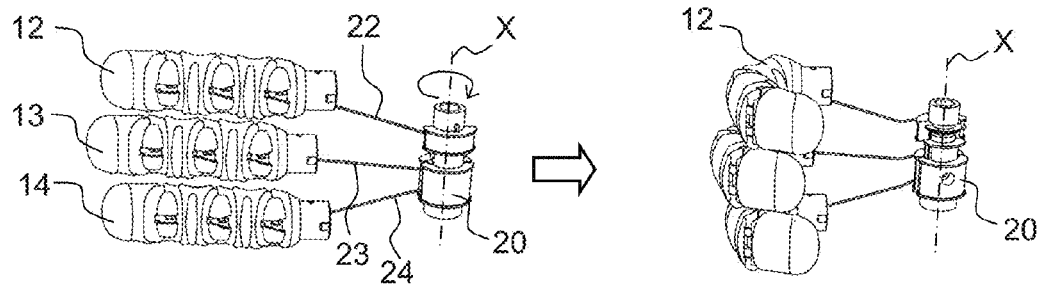
FIGS. 4a and 4b illustrate the principle according to the invention for the displacement of the fingers of the hand from the "open hand" configuration respectively to the "closed hand" configuration and the "index finger extended" configuration.
Figure 4B:
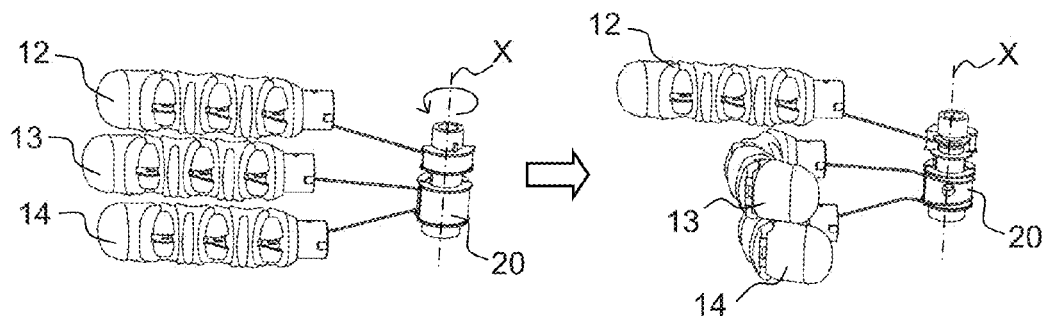

FIGS. 4a and 4b illustrate the principle according to the invention of the displacement of the fingers of the hand from the "open hand" configuration respectively to the "closed hand" configuration and the "index finger extended" configuration. The two figures show three fingers of the hand, the index finger 12, the middle finger 13 and the ring finger 14. The palm and thumb are not represented. In the left part of the two figures, the three fingers are in their position of rest, maintained by spring effect. In the right part of FIG. 4a, the three fingers are in their compressed position ("closed hand" configuration). In the right part of FIG. 4b, the middle finger 13 and the ring finger 14 are in their compressed position, the index finger 12 is maintained in position of rest ("index finger extended" configuration).

The hand comprises a motorized shaft 20 linked to each of the fingers 12, 13 and 14 by a link part 22, 23 and 24, here consisting of a flexible cable linked on one side to the finger and on the other side to the motorized shaft 20. The motorized shaft 20 can be located in the palm 15 of the hand, or else in the forearm of the robot, or even in the torso of the robot by adapting the length of the link parts. In the initial configuration represented in the left part, the link cables are stretched by the return force exerted by the springs of the fingers. Starting from this initial configuration, the motorized shaft 20 can be driven in two directions of rotation about a main axis referenced X. The rotation of the shaft drives the cable which is wound around the shaft by exerting a pulling force countering the spring effect. The finger is folded down, by being displaced from its position of rest to its compressed position. Advantageously, the shaft can have a first radial profile on which the cable is wound upon a rotation in a first direction of rotation, and a second radial profile on which the cable is wound upon a rotation in an opposite direction of rotation. Similarly, the shaft can have several first and second profiles formed in succession along the main axis X; each finger having associated with it a first and a second radial profile, onto which the cable of each of the fingers can be wound. The definition of the first and second radial profiles makes it possible to define, with great design flexibility, the two movements of the hand that can be driven by one and the same rotary actuator.

Figure 5:
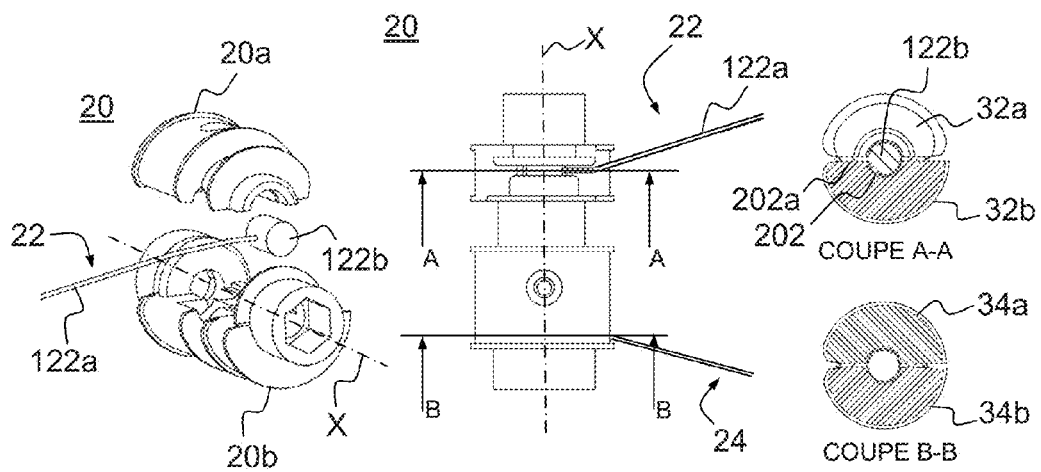
FIG. 5 represents a motorized shaft and link parts implemented in the humanoid robot hand according to the invention.

FIG. 5 represents the motorized shaft and the link parts implemented in the example of a hand. The left part of the figure shows, by exploded view, the motorized shaft 20, formed by an upper part 20a and a lower part 20b, and the link part 22 of the finger 12 comprising a flexible cable 122a and a crimping 122b. The link part 22 is linked on one side to the finger 12 and on the other side to the shaft 20, by means of the crimping 122b housed in a cavity 202 of the shaft 20.

The central part of the figure shows, by side view, the shaft 20 and the link parts 22 and 24 of the fingers 12 and 14. The right part of the figure shows the same components by means of two views in cross section A-A and B-B. As represented in these figures, the cable 122a passes radially through the shaft through a duct 202a linking the cavity 202 and an end of the first radial profile 32a and an end of the second radial profile 32b. Thus, depending on the direction of rotation of the shaft, the cable 22 of the index finger 12 can be wound onto one of the two radial profiles 32a or 32b represented in the cross-sectional view A-A. Similarly, the cables 23 and 24 of the middle finger 13 and of the little finger 14 are wound onto one of the two radial profiles 34a or 34b represented in the cross-sectional view A-A.

Note that, for each finger, the first and the second radial profile extend over a first and a second portion of the circumference. The first and second radial profiles have an end in common, corresponding to an end of the passage duct passed through by the cable. The first and the second radial profiles can be substantially circular and on a portion of circumference close to a semi-circle, as is the case for the radial profiles 34a and 34b associated with the fingers 13 and 14. The diameters of the first and second radial profiles then determine the travel of the cable and the amplitude of the displacement of the finger. This choice is not limiting on the invention. Non-circular radial profiles can be envisaged, making it possible to adapt the rate of displacement of the finger upon a rotation of the shaft. Similarly, the shaft can be driven so as to cover all the length of the radial profile or simply a part thereof.

It is also possible to configure the motorized shaft so as to maintain a finger in the position of rest upon a rotation of the motorized shaft. This is in particular the case illustrated by FIG. 3b for the index finger 12 which remains in the position of rest despite the rotation of the shaft in the first direction of rotation. For that, the crimping 122b of the link part 22 is of a form having one possible axis of rotation, for example substantially cylindrical or spherical, and mounted to rotate freely in the cavity 202 about an axis merged with the main axis of rotation of the shaft. Furthermore, the duct passes through the shaft radially over the entire portion of circumference of the first radial profile. When configured thus, the cable 122a can pass radially through the shaft over the entire portion of circumference of the first radial profile. The rotation of the shaft in the first direction of rotation drives a rotation of the crimping 122b relative to its housing cavity 202, the cable 122a remaining tight by spring effect. The finger remains maintained in the position of rest upon the rotation of the shaft in the first direction of rotation. On the contrary, the rotation of the shaft in the opposite direction winds the cable against the second radial profile 32b, driving the displacement of the index finger.

Advantageously, the definition of the first and of the second radial profiles offer a great design flexibility for the two movements of the fingers of the hand. Some fingers can advantageously be linked to the shaft by a common radial profile, such that the fingers are displaced according to a same rate profile and a same amplitude. In the example represented, such is the case for the middle finger 13 and the ring finger 14.

Figure 6A:
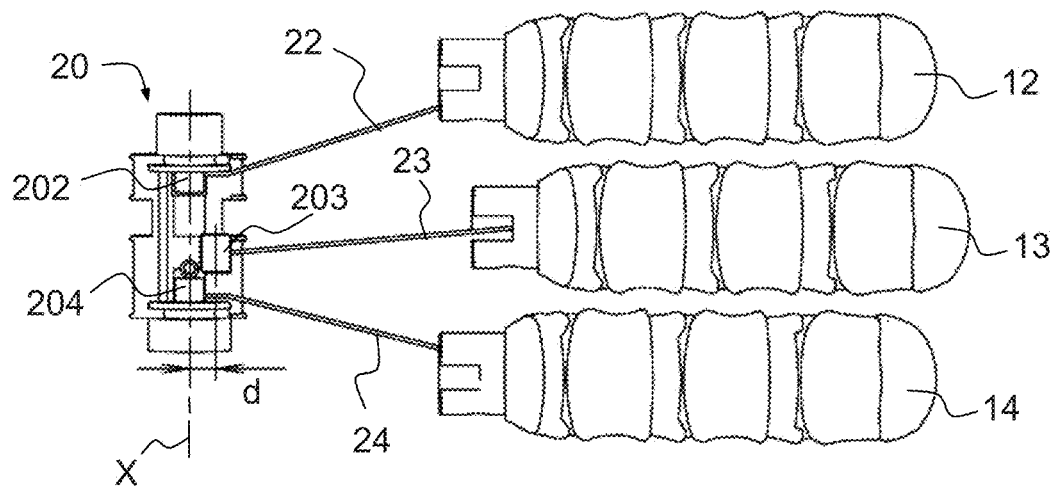
FIGS. 6a and 6b represent, by two views, the motorized shaft and the link parts between the shaft and three fingers of the hand of the robot.
Figure 6B:
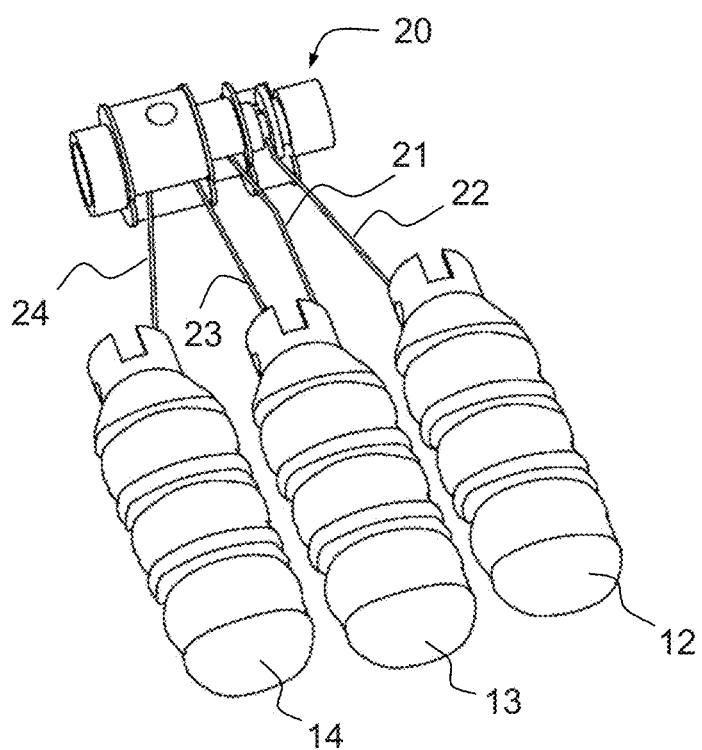

FIGS. 6a et 6b represent, according to two views, the motorized shaft and the link parts between the shaft and three fingers of the hand of the robot.

To simplify the manufacturing of the robot and reduce the production costs thereof, the present invention envisages a hand implementing several strictly identical fingers. In the example represented, the index finger 12, the middle finger 13 and the ring finger 14 are three fingers with three identical phalanges and consist of the same components. The three fingers are distinguished only by their location in the palm of the hand. To reinforce the humanoid nature of the hand, the three fingers are linked to the palm of the hand at three points substantially forming a circular arc; the index finger 12 and the ring finger 14 being located set back relative to the middle finger 13. Advantageously, the shaft is located in the palm of the hand so that the index finger 12 and the ring finger 14 are substantially at one and the same distance from the axis of rotation of the shaft. Thus, two strictly identical link parts 22 and 24 can be implemented for these two fingers. As represented in FIG. 5a, the crimpings for the link parts 22 and 24 are housed in two cavities 202 and 204 formed in the shaft on the main axis of the shaft. An identical link part 23 can also be implemented for the middle finger 13. For that, the crimping of the link part 23 is housed in a cavity 203 formed in the shaft at a distance referenced "d" from the main axis of the shaft. Thus, the distance "d" corresponds to the location offset of the fingers in the palm, thus forming the circular arc mentioned previously. Although the housing cavities of the link means 23 and 24 are formed in the shaft at two distinct distances from the axis of rotation of the shaft, the travel of the cables during a rotation is identical in as much as the radial profiles are identical. The displacements of the middle finger and of the ring finger are therefore identical.

Advantageously, the link means can be strictly identical, notably the length of the link cable; their distinct location on the motorized shaft allowing for a location at a distinct distance from the motorized shaft.

Note finally that linking all the fingers of the hand to the motorized shaft, and in particular the thumb by means of a link part 21 represented in FIG. 5b, is also envisaged.

As mentioned previously, the implementation of a link part comprising a flexible cable driving the displacement of the finger by winding around a motorized pulley is only one particular example. Other forms of link parts are also envisaged, for example a rigid link driven by means of a first and a second cam of the shaft by rotation of the shaft in a first direction and in the opposite direction. These different embodiments advantageously exploit the two motor capabilities of a rotary actuator to confer two possible movements on the fingers of an underactuated hand. For that, these different embodiments have in common the particular features set out in the main claim below.

The invention claimed is:

1. A hand intended for a humanoid robot, the hand comprising:
    a palm;
    a plurality of fingers, each of the fingers being configured to be displaced in relation to the palm between a position of rest maintained by a spring effect and a compressed position obtained by driving a link part between said finger and the palm, countering the spring effect; and
    a motorized shaft linked to the link part of each of the fingers and configured to displace, from the position of rest to the compressed position, at least one first finger of the fingers by rotation of the motorized shaft in a first direction of rotation and at least one second finger of the fingers by rotation of the motorized shaft in a second direction of rotation opposite the first direction of rotation,
    wherein two of the fingers are located on the palm so as to be like a thumb and an index finger,
    wherein, upon rotation of the shaft in the first direction, the index finger or the thumb is maintained in the position of rest, and
    wherein, upon rotation of the shaft in the second direction, all the fingers of the hand are displaced to the compressed position so as to represent, with the palm, a closed hand.

2. The hand as claimed in claim 1, wherein the shaft comprises:
    a first radial profile on a first portion of a circumference of the shaft configured to drive the link part of a finger of the fingers upon a rotation of the shaft in the first direction of rotation; and
    a second radial profile on a second portion of the circumference of the shaft configured to drive the link part of the finger upon a rotation of the shaft in the second direction of rotation.

3. The hand as claimed in claim 2, wherein one of the fingers is configured to be displaced by rotation of the shaft in only one of the first and second directions of rotation.

4. The hand as claimed in claim 2, wherein the fingers in the position of rest represent, with the palm, an open hand.

5. The hand as claimed in claim 2, wherein the link part of one of the fingers comprises a cable linked on one side to the finger and on the other side to the shaft by means of a crimping housed in a cavity of the shaft, the cable passing radially through the shaft through a duct linking the cavity and an end of one of the radial profiles, such that the rotation of the shaft in one direction of rotation winds the cable on said radial profile, driving the displacement of the finger by pulling the cable.

6. The hand as claimed in claim 5, wherein said radial profile is substantially circular over a portion of circumference close to a semi-circle centered on an axis of rotation of the shaft, and on which the cable of a finger can be wound, a diameter of the radial profile determining the travel of the cable and an amplitude of the displacement of the finger between the position of rest and the compressed position.

7. The hand as claimed in claim 5, wherein the link part of one of the fingers comprises a crimping mounted to rotate freely in the cavity centered on an axis of rotation of the shaft, the duct being configured to allow the cable to pass through the shaft radially all along a radial profile such that the finger is maintained in the position of rest upon a rotation of the shaft.

8. The hand as claimed in claim 5, wherein the shaft has several first and second radial profiles arranged in succession according to an axis of rotation of the shaft, for the simultaneous displacement of several fingers.

9. The hand as claimed in claim 5, wherein two of the fingers are identical and linked to the shaft by two cables of identical lengths and two identical crimpings, the shaft comprising two housing cavities formed in the shaft at two distinct distances from an axis of rotation of the shaft, making it possible to locate the two identical fingers in the palm of the hand at two distinct distances from the axis of rotation of the shaft.

10. A humanoid robot equipped with a hand as claimed in claim 1.

* * * * *